Dec. 2, 1930.  C. W. VOGT  1,783,866
PROCESS AND APPARATUS FOR TREATING MATERIALS
Original Filed March 17, 1928   3 Sheets-Sheet 1
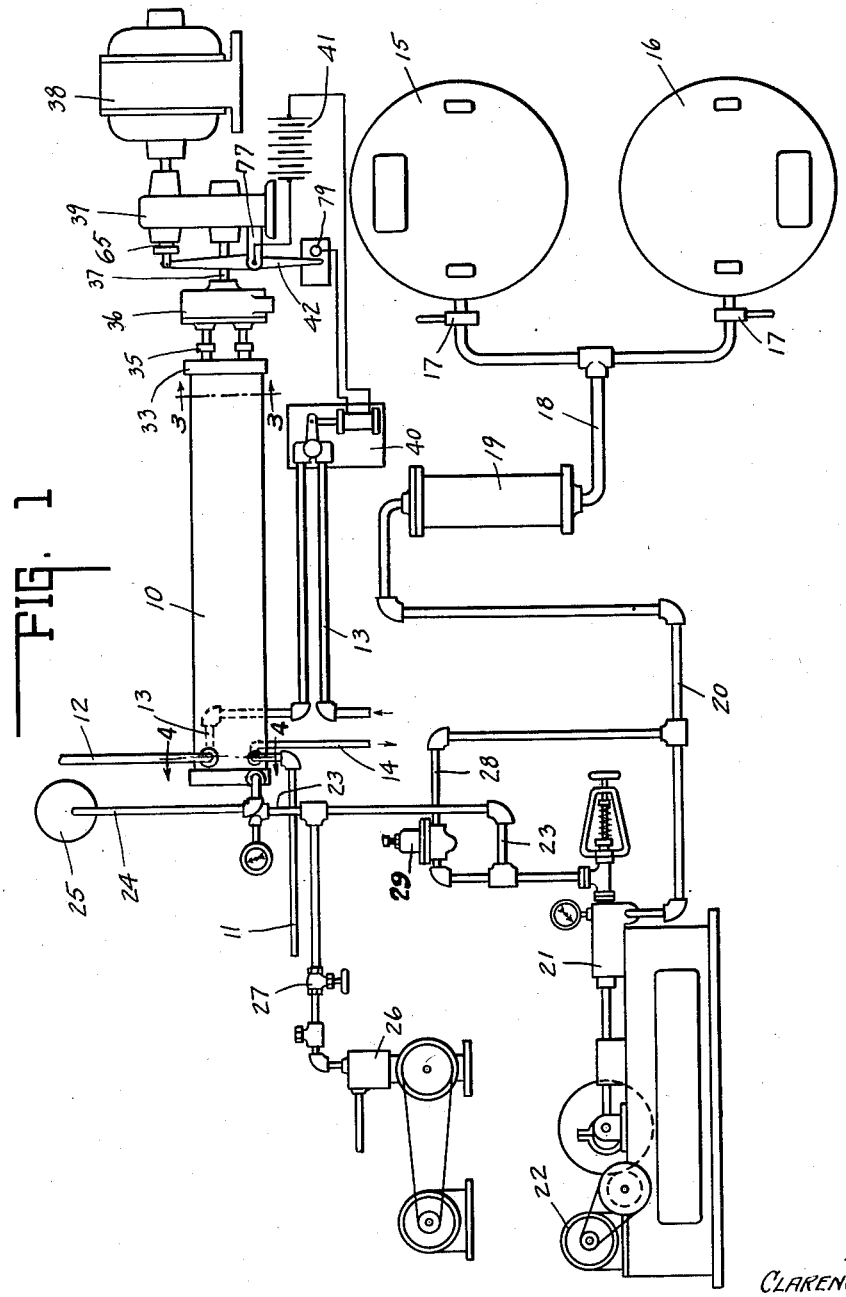
INVENTOR.
CLARENCE W. VOGT.
BY
ATTORNEYS.

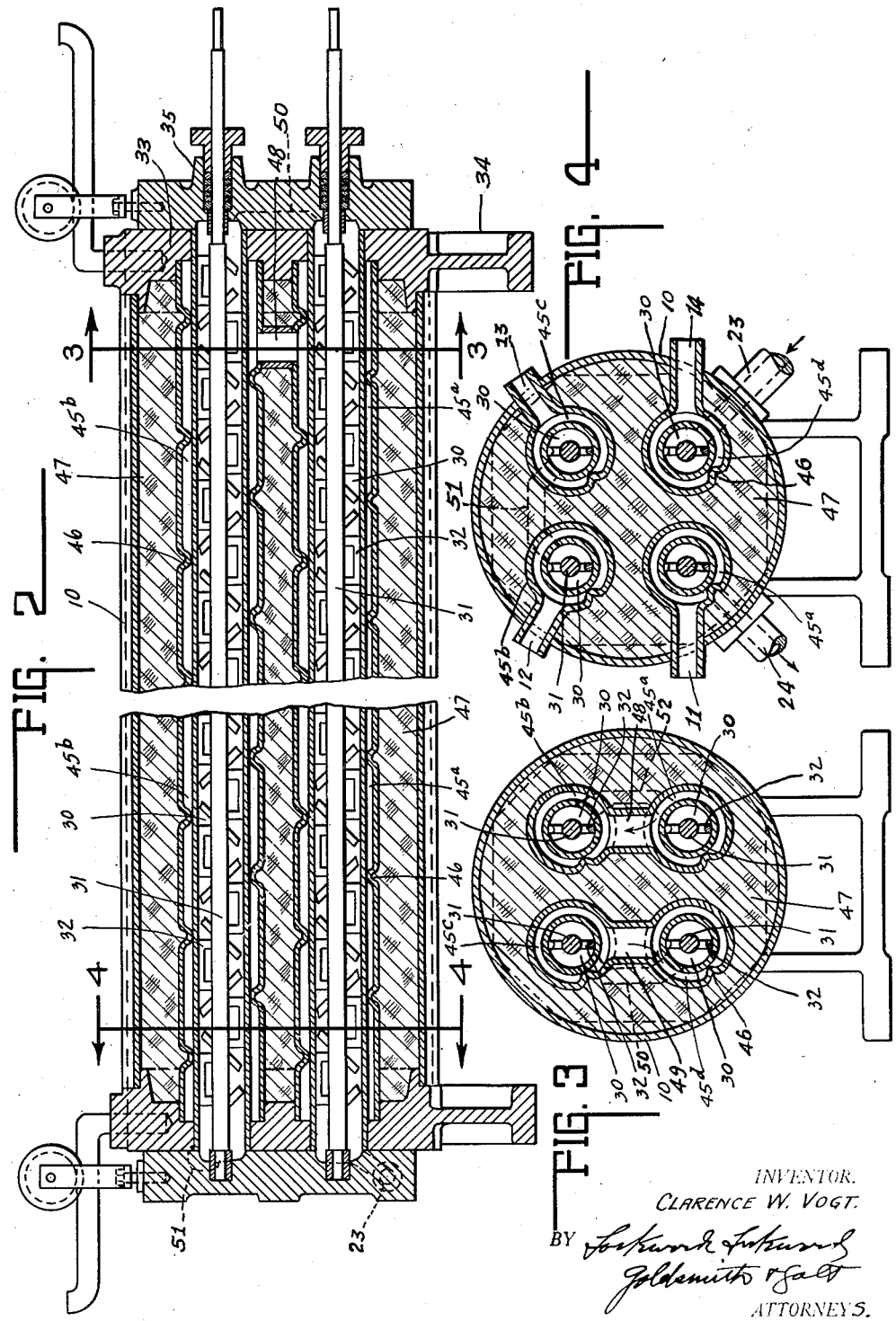

Dec. 2, 1930.   C. W. VOGT   1,783,866
PROCESS AND APPARATUS FOR TREATING MATERIALS
Original Filed March 17, 1928   3 Sheets-Sheet 3
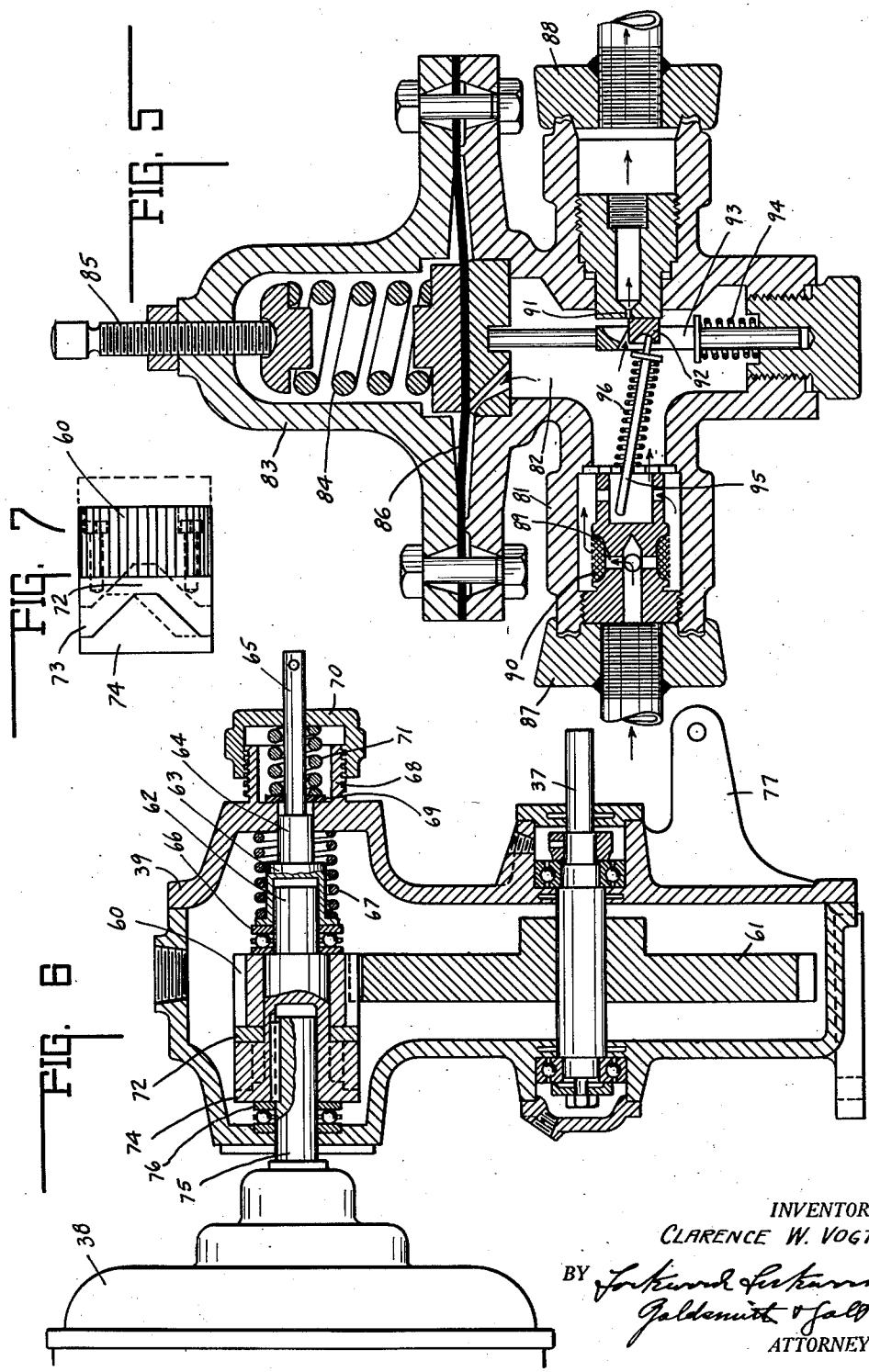
INVENTOR.
CLARENCE W. VOGT.
BY
ATTORNEYS.

Patented Dec. 2, 1930

1,783,866

UNITED STATES PATENT OFFICE

CLARENCE W. VOGT, OF LOUISVILLE, KENTUCKY, ASSIGNOR TO VOGT INSTANT FREEZERS, INC., OF LOUISVILLE, KENTUCKY, A CORPORATION

PROCESS AND APPARATUS FOR TREATING MATERIALS

Original application filed March 17, 1928, Serial No. 262,339. Divided and this application filed December 31, 1928. Serial No. 329,596.

This invention relates to a process and apparatus for treating materials, which are particularly adaptable for use for manufacturing ice cream, sherbet and the like, and also for the processing of vegetable and animal oils, and all other materials wherein it may be desirable to cool the same or change the temperature while being agitated or whipped.

This application is a division from application Serial No. 262,339, filed March 17, 1928.

The principal object of the invention is to provide a power operated machine of this character through which a material or mix may be continuously passed from one end to the other so as to be cooled or changed in temperature while being whipped or agitated. In respect to the manufacture of ice cream, this machine may be conveniently used by injecting the mix under pressure at one end with the proper quantity of fluid such as air, carbon dioxide, or the like to obtain the desired over-run, and forcing it under pressure while being frozen and whipped through the cooling or processing chamber.

Wherein it is desired to employ the machine with respect to the manufacture of substitutes for lard, oleomargarine and the like, it has the advantage of processing such material under pressure greater than the atmosphere so that by closing or reducing the fluid intake, the material may be processed with a predetermined amount of fluid incorporated therein. With such material, it is highly advantageous by means of this machine to process the same under pressure greater than the atmosphere, and at a uniform rate, whereby the crystallization takes place quickly and uniformly caused by the beating or whipping of the material as it is cooled, and thus obtaining a smoother quality of product, eliminating therefrom hard or gritty particles heretofore created by the non-uniformity of the crystallization during the cooling process. The machine is also applicable to the processing of eggs, wherein it is desired to freeze the yolks and whites of the eggs after they are broken. By means of this machine, the eggs are frozen as they are stirred or mixed under greater than atmospheric pressure so that no air will be beaten into the product causing deterioration. Other materials may likewise be processed with the same or similar advantages.

A further object of the invention is to control the plasticity and density of the product being processed, while at the same time maintaining the machine at the maximum operating efficiency. This is accomplished by providing what may be termed a plasticity control valve for controlling the quantity of material pumped into the chamber, this valve being adapted to be operated through the medium of the processing pressure on the material passing through the processing or cooling chamber.

Another object of the invention is to provide an electric control for the temperature changing medium which is operated by the resistance to the drive set up by the material. Thus, if the plasticity of the material becomes too great, or is not sufficiently taken care of by the plasticity valve, the torque controlled mechanism actuated through the resistance of the material will energize a solenoid for operating a control valve for either shutting off the passage of the refrigerating medium therethrough or reducing it so as to reduce the cooling of the material. Such reduction in the cooling of the material decreases the plasticity and thereby the resistance until the torque control returns to normal position for permitting the valve to open.

Further, the solenoid may be utilized, if desired, for controlling the power supply, whether electrical or mechanical.

The full nature of the invention will be understood from the accompanying drawings and the following description and claims:

Figure 1 is a diagrammatical illustration of the machine. Fig. 2 is a longitudinal vertical section through two of the processing chambers. Fig. 3 is a section taken on the line 3—3 of Figs. 1 and 2. Fig. 4 is a section taken on the line 4—4 of Figs. 1 and 2. Fig. 5 is a central vertical section through the plasticity control valve. Fig. 6 is a central vertical section through the torque control.

Fig. 7 is a plan view of one of the torque control elements.

In the drawings there is shown a processing apparatus 10 having water intake pipe 11 and discharge pipe 12, a brine intake pipe 13 and brine return pipe 14. The material to be processed is initially contained in the tanks 15 and 16 so as to be alternately drawn therefrom through the valves 17 to the pipe 18, through the filter 19 and pipe 20 to the homogenizer or pump 21 driven in the usual manner by the motor 22. From the homogenizer or pump 21 the material is forced through the pipe 23 into one end of the processing apparatus 10, and after passing therethrough is discharged through the pipe 24 into a suitable container or receptacle 25.

Connected with the intake line 23, there is a fluid line for air, carbon dioxide or the like, connected with the air pump 26 driven from a motor or other suitable source of power, the fluid line being controlled by the valve 27 so that any desired amount of fluid may be forced into the processing apparatus with the material. A by-pass line 28 is provided by passing the main line 23 between the homogenizer or pump 21 and the apparatus 10. Mounted in the by-pass line 28 there is a plasticity control valve 29 for controlling the plasticity of the material processed.

The processing apparatus 10, as shown in Figs. 2 and 3, comprises a plurality of tubular processing passageways or chambers 30 through which agitating or whipping members extend which consist of shafts 31 having blades or paddles 32 mounted thereon. The tubular processing chambers 30 extend through an end header 33 which is supported by the base 34, and to which is secured the stuffing box header 35 through which the driving ends of the shafts 31 extend.

The shafts 31 of the agitating or whipping members are driven from suitable gears contained in the gear housing 36, said gears being driven by a common drive shaft 37. The shaft 37 is in turn driven by the electric motor 38 through the torque or resistance control contained in the housing 39, and illustrated in Fig. 6. Mounted in the brine intake pipe 13, there is a solenoid control valve 40, the solenoid being connected in the circuit with a source of current 41, said circuit having a switch therein controlled by the switch lever 42, which lever is actuated by the torque control mechanism as hereinafter described.

In the processing apparatus 10, each of the chambers 30 is surrounded by a temperature changing chamber 45a, 45b, 45c or 45d, comprising substantially cylindrical tubes spaced from their respective tubular chambers 30 and surrounding the same. Said tubes have their inner surface provided with spirally formed corrugations 46 which abut the outer surface of the processing chambers 30 so as to direct the temperature changing medium passing through the chambers in a swirling motion thereabout. Surrounding said chambers there is provided the usual insulation 47.

As illustrated in Fig. 3, a temperature changing medium, which may be either in the form of water, steam or brine, is introduced through pipe 11 to one end of the chamber 45a, passing through substantially the length thereof and through the passage 48 to the chamber 45b, and throughout the length thereof until it is discharged from the discharge outlet 12. The medium is also passed through the inlet 13 to one end of the chamber 45c, through the passageway 49 to the chamber 45d and out through the discharge outlet 14. Thus, the medium is caused to pass back and forth through separate pairs of chambers. This permits the use of water as a cooling medium for one pair of chambers and brine for the other pair where the material is such that it need not be cooled to a substantially low degree. For instance, in the processing of substitutes for lard, oleomargarine or the like, the material will be cooled from about 110 to 120 degrees F. in liquid form to approximately 50 degrees F. in its plastic form. On the other hand, when ice cream or the like is processed or any other material which should be frozen, it may be necessary to use brine in both pairs of chambers since the liquid introduced is approximately 70 degrees F. and is discharged at approximately 20 degrees F.

The material is caused to pass through all four of the processing chambers 30 so that in effect the distance of travel of the material in the processing apparatus 10 will be approximately four times its length. The material is taken in through the pipe 23 and forced through the tubular chambers 30 surrounded by the temperature changing chamber 45d during which time it is agitated and whipped by the blades or paddles 32.

When the material reaches the opposite end of the chamber 30, it will be cooled to approximately the water temperature and will pass through the passage 50 in the bearing head 35 to the upper chamber 30 surrounded by the chamber 45c, and thence through the passage 51 to the brine cooled chamber 30 surrounded by the chamber 45b, and through the passageway 52 to the chamber 30 surrounded by the chamber 45a and thence through the discharge pipe 24 to the container 25.

The operation or driving power of the machine is controlled through the medium of the mechanism, illustrated in Fig. 6, wherein the gear casing 39 contains a pinion 60 adapted to mesh with and drive the gear 61 which is keyed to the shaft 37, mounted therein. The pinion 60 is carried on a stub shaft 62 rotatably mounted in the socket 63 formed with a projection 64 having a reduced rod 65 extending therefrom and slidably mounted in said housing 39. A thrust bearing 66 is positioned between the pinion 60 and the socket 63. Between the enlarged flanged portion of the socket 63 and the inner surface of the housing, there is a light compression spring 67. Mounted on the rod 65 and within the well 68 formed on the housing 17, there is a washer 69. Between said washer and the adjusting nut 70, which screws on to the well 68, there is a relatively heavy compression spring 71. On the opposite side of the pinion 60 there is fastened an extension 72 provided with oppositely extending V-shaped projection 74 forming a V-shaped pocket into which the driving member 74 extends, as best illustrated in Fig. 7. The driving member 74 is keyed to the stub shaft 75 of the motor having its bearing in the housing 39 and is separated from the side wall of the housing by the thrust bearing 76.

The lever 42 is fulcrumed on the projection 77, extending outwardly from the housing 39, the upper end of said lever being connected with the end of the rod 65 and the lower end thereof having the electric contact member 79 which is adapted to close the circuit through the solenoid valve of the usual character, and the source of power 41.

By means of this arrangement, when the plasticity of the material has become so great as to offer such resistance as will overcome the tension of the adjusting spring 71, there will be a separation of the pinion 60 and driving member 74 through the engagement of their cam faces. This will cause the rod 65 to move to a position wherein the lever 42 will close the circuit through the solenoid valve 40. Thus, the solenoid will become energized and will act to close the valve in the brine pipe 13 or reduce the passage therethrough. This operation will lower the cooling action in the cooling chambers 45c and 45d to such an extent as to reduce the plasticity of the material due to its cooled or frozen state. When the plasticity has been so reduced as to permit freer action of the driving mechanism, the torque control assumes its normal position breaking the circuit through the solenoid 40 to permit a free flow of the brine or cooling medium therethrough. While the solenoid valve has been indicated herein as connected with the brine intake pipe 13, it may likewise be connected with the water intake pipe 11 or any other cooling medium.

One of the functions of the torque control operating upon the cooling medium is to act as an auxiliary plasticity control for the plasticity control valve. In event the material is used up so as to prevent proper functioning of the plasticity valve, the action of the torque control valve will shut off the cooling medium and lower the temperature, thereby reducing the plasticity. It will likewise operate in event the refrigerating action of the cooling medium is excessive for the material being processed. The torque control valve will operate to reduce and maintain the flow of cooling medium at a reduced rate for providing the proper cooling action for the material passing therethrough.

As illustrated in Fig. 5, the plasticity control valve 29 comprises a valve body 81 forming a pressure chamber therein in which the relatively heavy compression spring 84 is positioned, said spring being adjusted as to tension by the adjusting screw 85. The head and spring 84 are separated from the body portion and chamber 82 by the diaphragm 86.

The inlet nipple 87 and the outlet nipple 88 are connected in the by-pass pipe line 28. The inlet communicates with the pressure chamber 82 through the ports 89 surrounded by the mesh strainer 90, and the chamber 82 communicates with the outlet through the valve port 91. The valve gate 92 is supported by the valve stem 93 having its upper end contacting with the diaphragm and its lower end slidably mounted in the lower portion of the valve body 81 and is provided with valve spring 94. The valve gate 92 is held in position by the rod 95 having a toggle joint connection therewith surrounded by the spring 96. Thus, when the pressure in the chamber 82 is increased sufficiently to force the diaphragm upwardly against the spring 84 the valve gate will close the valve port 91 preventing the material from by-passing through the pipe 28. The operation of this valve is such that when in normal open position the material will be forced by the pump under pressure to the processing apparatus 10, and a portion thereof will by-pass and return through the by-pass pipe 28 and valve 29. When the material being processed reaches a predetermined degree of plasticity by reason of its cooled condition, the resistance to the new material being pumped into the apparatus will build up a pressure in the chamber 82 sufficient to overcome the spring 84, raise the diaphragm 86 to close or partially close the valve port 91. Thus, the by-passing of the liquid is reduced or shut off and more liquid is accordingly forced into the processing apparatus 10. As this additional liquid is forced therein, by reason of its relatively high temperature additional heat will be carried into the apparatus therewith so as to raise the temperature of the material contained therein and thus reduce the plasticity thereof.

The plasticity valve thereby controls the plasticity to the desired degree, while at the same time permitting the processing of the material with a maximum degree of efficiency. The maximum amount of cooling medium is continuously used while the plasticity of the material is controlled by the variation in the amount of material pumped into the processing apparatus. When the plasticity becomes too great and should be reduced, more material is pumped therein, thereby reducing it, and when the plasticity decreases a lesser amount of material is pumped into the processing apparatus. Thus, the amount of cooling medium used or the amount of heat units removed may remain constant and be maintained at the highest degree of efficiency, while at the same time any variation in the cooling medium, or the number of heat units removed thereby, will be compensated for by the valve 29 by varying the amount of material. The desired plasticity may be obtained and held substantially constant by the adjusting screw 85 varying the tension placed upon the spring 84.

It will be noted from the foregoing that within narrow limits of the variations in plasticity, the plasticity control valve operates to maintain the processing of the material at maximum efficiency, while beyond such narrow limits and between relatively wide limits, the torque control mechanism will be caused to operate the valve controlling the temperature changing medium. Thus the torque control takes effect when the plastic condition of the material has gone beyond the relative narrow limits within which the plasticity control valve operates.

Whereas one arrangement of electrical hook-up is shown herein merely for illustrative purposes, it would be understood that various circuits and switch constructions may be employed for controlling the action of the temperature changing medium through the torque control lever. Furthermore if desired, a hand operated switch may be incorporated in the circuit.

Whereas the invention is herein illustrated as employing one pair of water cooled chambers and one pair of brine cooled chambers, the invention contemplates the use of any desired temperature changing or heat transfer medium or combination of mediums. In addition thereto, wherein desired, such medium may be eliminated or cut off from one or more of the chambers so as to permit a whipping or agitating action after the temperature of the material has been changed and before it is discharged, such whipping or agitating action to be conducted free from further heat transfer by such medium.

The invention claimed is:

1. A machine for processing materials, comprising a processing chamber, means for supplying the material to be processed, thereto under pressure, and a valve associated with said supply means and actuated by the pressure of the material thereon for varying the in-put of material for controlling the plasticity thereof.

2. A machine for processing materials, comprising a processing chamber, means for positively forcing the material to be processed therethrough, a by-pass for said material and a plasticity valve in said by-pass, said valve being constructed to permit the by-passing of part of the material before reaching said chamber when the material in said chamber is of low stiffness and reduce the by-passing of material whereby a greater amount thereof is introduced in said chamber when the processed material is of greater stiffness.

3. A machine for processing materials, comprising a processing chamber, means in said chamber for agitating and processing the material passing therethrough, means for associating a temperature-changing medium with said chamber, electric means for controlling the supply of said medium, and a torque control governed by the condition of the material passing through said chamber for operating said electric means.

4. A machine for processing materials, comprising a processing chamber, means in said chamber for agitating and processing the material passing therethrough, means for associating a temperature-changing medium with said chamber, a valve for controlling the passage of said medium thereto, electrically operable means for actuating said valve, and a torque control mechanism governed by the condition of said material for electrically controlling said electrically operable means.

5. A machine for continuously processing materials, comprising a processing chamber, means for continuously passing material to be processed therethrough, an agitating and processing member rotatably mounted in said chamber, a pipe line for supplying a temperature-changing medium to said chamber, a valve in said pipe line, an electrically operable control for said valve, driving means for said member, and a mechanism connected between said driving means and processing member adapted to be actuated by the torque imparted to said processing member by the resistance of said material for actuating said control, whereby the passage of said medium to the chamber will be varied in accordance with the resistance of the material.

6. A machine for processing materials, comprising a processing chamber, means for positively forcing the material to be processed therethrough, means for applying a temperature-changing medium thereto for varying the temperature of the material while being processed, means actuated by the pressure of the material thereon for varying the inlet of material so as to control the plasticity thereof within narrow limits, and means for controlling the temperature-changing medium actuated by the resistance due to the plasticity of the material for controlling the plasticity thereof between relatively wide limits.

7. The process of controlling the plasticity of a material positively forced under pressure through a processing chamber having a temperature changing medium adapted to interchange a substantially constant amount of head units therewith, consisting in controlling the discharge of the material into said chamber so as to increase the amount of material discharged thereinto when a high condition of stiffness is reached for reducing the same, and discharging a lesser quantity of material into said chamber when a lower condition of stiffness is reached for increasing the same.

8. The process of controlling the plasticity of a material positively forced under pressure through a processing chamber having a temperature-changing medium associated therewith consisting in controlling the discharge of the material into said chamber so as to vary the amount of material discharged therein for controlling the plasticity within narrow limits, and controlling the amount of temperature changing medium applied to said chamber by the resistance to the processing of the material owing to its plasticity, whereby the plasticity may be controlled through the variation of said medium between relatively wide limits.

9. The process of treating materials including the continuous passage thereof through a processing chamber, altering the plasticity of the material while in said chamber, and automatically varying the supply of material thereto responsive to variations in the plasticity of the material under process whereby said material is discharged with a substantially uniform plasticity.

10. A machine for processing material including a processing chamber having means for changing the plasticity of a material associated therewith, mechanism for supplying said material thereto and means for varying the supply of material automatically dependent upon the plasticity of the material in said chamber.

11. A machine for processing materials including a processing chamber having a temperature-changing medium associated therewith for changing the plasticity of material under process, mechanism for supplying said material thereto and means for varying the supply of material automatically dependent upon the plasticity of the material in said chamber.

12. A machine for processing materials including a processing chamber having a refrigerant associated therewith for changing the plasticity of material under process, mechanism for supplying said material thereto and means for varying the supply of material automatically dependent upon the plasticity of the material in said chamber.

13. A machine for processing materials including a processing chamber having a medium associated therewith for changing the plasticity of material under process, mechanism for supplying said material thereto and means for automatically increasing the rate of supply of said material when the stiffness of material in said chamber increases and automatically decreasing the said rate of supply when said stiffness decreases.

14. A process of treating materials including positively forcing the same through a processing chamber under pressure, altering the plasticity of the material while passing therethrough, and automatically controlling the alteration of plasticity responsive to the pressure required to introduce the material into said chamber.

15. A process of treating materials including positively forcing the same through a processing chamber under pressure, altering the plasticity of the material while passing therethrough and automatically reducing the stiffness of material under process when the pressure required to introduce said material increases and automatically increasing the same when said pressure decreases.

16. A machine for processing materials including a processing chamber, means for supplying a material thereto to be processed under pressure, means for altering the plasticity of the material under process, and means actuated by the pressure of material supplied for controlling the alteration of said plasticity.

17. A machine for processing material including a processing chamber, means for supplying a material thereto to be processed under pressure and mechanism for automatically decreasing the stiffness of the material under process when the pressure required to introduce the same to said chamber increases and for automatically increasing said stiffness when said pressure decreases.

18. A process of treating materials including continuously passing the same through a processing chamber under pressure and automatically controlling the rate of supply of said material responsive to the pressure required to introduce said material into said chamber.

19. A process of treating materials including positively forcing the same through a processing chamber under pressure, altering the physical condition of the material while passing therethrough in such manner that the pressure required to introduce the material is altered, and automatically controlling the rate of supply of said material responsive to variations in said pressure.

20. A process of treating materials including positively forcing the same through a processing chamber under pressure, altering the physical condition of the material while passing therethrough in such manner that the pressure required to introduce the material is altered, and automatically increasing the rate of supply of said material when said pressure increases, and decreasing the rate of supply of said material when said pressure decreases.

21. A machine for processing material including a processing chamber, means for supplying a material thereto to be processed, means for associating a medium with said chamber whereby the physical condition of said material is altered in such manner as to alter the pressure required to introduce said material thereto, and mechanism for automatically increasing the rate of introduction of said material, when said pressure is increased and for automatically decreasing the rate of introduction when said pressure is decreased.

22. In a machine for processing material, the combination with a processing chamber, a pump for supplying material to said chamber under pressure and a pipe line between said pump and said chamber, of a plasticity valve for controlling the plasticity of the processed material, said valve including a housing, a diaphragm in said housing dividing the same into a pressure chamber and a spring chamber, said pressure chamber being connected to said pipe line and said diaphragm being movable responsive to pressure therein, a spring in said chamber adapted to resist the motion of said diaphragm, an outlet port communicating with said pressure chamber, and a valve controlled by the movement of said diaphragm for opening said outlet port for by-passing of material when pressure in said chamber is less than the pressure of said spring.

23. In a machine for processing material, the combination with a processing chamber, a pump for supplying material to said chamber under pressure and a pipe line between said pump and said chamber, of a plasticity valve for controlling the plasticity of the processed material, said valve including a housing, a diaphragm in said housing dividing the same into a pressure chamber and a spring chamber, said pressure chamber being connected to said pipe line and said diaphragm being movable responsive to pressure therein, a spring in said spring chamber adapted to resist the motion of said diaphragm, an outlet port communicating with said pressure chamber, a valve controlled by the movement of said diaphragm for opening said outlet port for by-passing of material when pressure in said chamber is less than the pressure of said spring, and means for adjusting the pressure of said spring for varying the operating pressure of said valve.

24. A machine for processing materials, including a processing chamber, means for positively forcing the material to be processed therethrough, a by-pass for relieving said means of excess material, a valve in said by-pass, and means controlled by the resistance of the material in the chamber due to its plasticity for controlling said valve.

25. A machine for processing materials, including a processing chamber, means for positively forcing the material to be processed therethrough, and means controlled by the resistance of the material due to its plasticity for controlling the quantity of material forced into said chamber.

26. A machine for processing materials, including a processing chamber, means for introducing the material to be processed to said processing chamber, and means controlled by the plasticity of the material in said chamber for regulating the amount of material introduced therein.

27. The method of processing materials consisting in passing the material to be processed through a processing chamber altering the temperature thereof while agitating the same, and controlling the plasticity of the material through the resistance thereof due to its plasticity by introducing a greater or lesser quantity of material into said chamber.

28. The method of processing materials consisting in passing the material to be processed through a temperature altering chamber while agitating the same, forcing a temperature altering medium around said chamber, and electrically controlling the forcing of said medium therein by a control switch actuated through the resistance of the material to the agitation thereof.

29. A machine for processing materials, including a processing chamber, means for introducing material therein, a medium for altering the temperature thereof, an agitating member, a motor for driving said member, a torque connection between said motor and member actuated by the resistance to said member due to the plasticity of the material, means actuated by said torque connection, means for controlling the quantity of material introduced into said chamber for maintaining the desired plasticity of the material being processed therein, an electric circuit for controlling the action of said medium, and a switch in said circuit operated by said torque connection for controlling said circuit depending upon the resistance to said motor.

In witness whereof, I have hereunto affixed my signature.

CLARENCE W. VOGT.